(12) United States Patent
Fang et al.

(10) Patent No.: US 9,104,844 B2
(45) Date of Patent: Aug. 11, 2015

(54) PLATFORM AND METHOD FOR DYNAMIC SOFTWARE LICENSE

(75) Inventors: Tien-Chin Fang, Taoyuan County (TW); Ching-Yu Tsai, New Taipei (TW); Ming-Jen Chen, New Taipei (TW); Hung-Yu Yang, Changhua County (TW); Chia-Hung Lin, New Taipei (TW); Chen-Chung Lee, Nantou County (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 0 days.

(21) Appl. No.: 13/565,941

(22) Filed: Aug. 3, 2012

(65) Prior Publication Data
US 2013/0326637 A1    Dec. 5, 2013

(30) Foreign Application Priority Data
Jun. 5, 2012  (TW) .............................. 101120182 A

(51) Int. Cl.
G06F 7/04        (2006.01)
G06F 17/30       (2006.01)
H04N 7/16        (2011.01)
G06F 21/10       (2013.01)

(52) U.S. Cl.
CPC .................................... *G06F 21/105* (2013.01)

(58) Field of Classification Search
CPC ....................................................... G06F 21/10
USPC ........................................................... 726/28
See application file for complete search history.

(56) References Cited

U.S. PATENT DOCUMENTS

| 7,373,497 | B2* | 5/2008 | Circenis et al. | 713/100 |
|---|---|---|---|---|
| 7,426,485 | B1* | 9/2008 | Lobo et al. | 705/28 |
| 2002/0138441 | A1* | 9/2002 | Lopatic | 705/59 |
| 2004/0078339 | A1* | 4/2004 | Goringe et al. | 705/59 |
| 2007/0198427 | A1* | 8/2007 | Vajjiravel et al. | 705/59 |
| 2007/0208834 | A1* | 9/2007 | Nanamura et al. | 709/220 |
| 2007/0245409 | A1* | 10/2007 | Harris et al. | 726/5 |
| 2007/0300220 | A1* | 12/2007 | Seliger et al. | 718/1 |
| 2008/0071689 | A1* | 3/2008 | Tabet | 705/59 |
| 2012/0059917 | A1* | 3/2012 | Dawson et al. | 709/223 |
| 2012/0084393 | A1* | 4/2012 | Williams et al. | 709/217 |
| 2013/0191923 | A1* | 7/2013 | Abuelsaad et al. | 726/26 |

FOREIGN PATENT DOCUMENTS

TW          201118739 A      6/2011

OTHER PUBLICATIONS

Zongwei Luo; A Web Services Community Model for Services Provisioning; Year: 2005; IEEE; pp. 560-565.*
Taiwanese Office Action dated Jun. 20, 2014.

* cited by examiner

*Primary Examiner* — Monjour Rahim
(74) *Attorney, Agent, or Firm* — Rabin & Berdo, P.C.

(57) ABSTRACT

A platform and a method for dynamic software license are disclosed. The dynamic software license platform comprises a license pool, a register manager, a user configure unit and a license manager. The register manager receives a software application from a user end. The user configure unit grants a setting permission to the user end in response to the software application, and allows the user end to submit a license setting according to the setting permission. The license manager adds the software license provided by the software supplier to the license pool, and dynamically provides the software license from the license pool unit according to the license setting.

11 Claims, 5 Drawing Sheets

PLATFORM AND METHOD FOR DYNAMIC SOFTWARE LICENSE

This application claims the benefit of Taiwan application Serial No. 101120182, filed Jun. 5, 2012, the subject matter of which is incorporated herein by reference.

BACKGROUND OF THE INVENTION

1. Field of the Invention

The invention relates in general to a software license, and more particularly to a platform and a method for dynamic software license.

2. Description of the Related Art

Electronic devices may be equipped with various software programs to produce corresponding functions. For example, a personal computer may be equipped with operating system, anti-virus software, imaging software, scanning software, drawing software, photo software, editing software, word processing software or tool software. Conventionally, after a user purchased software and installed it to a personal computer, the user needs to get on line to perform authentication to obtain a software license. However, the conventional software marketing mode has gradually found it difficult to satisfy the user end's needs. Therefore, how to provide a dynamic software licensing mechanism has become a prominent task for the industries.

SUMMARY OF THE INVENTION

The invention is directed to a platform and a method for dynamic software license capable of dynamically providing a software license in response to the request from the user end.

According to an embodiment of the present invention, a platform for dynamic software license is disclosed. The dynamic software license platform comprises a license pool, a register manager, a user configure unit and a license manager. The register manager receives a software application from a user end. The user configure unit grants a setting permission to the user end in response to the software application, and allows the user end to submit a license setting according to the setting permission. The license manager adds the software license provided by the software supplier to the license pool, and dynamically provides the software license from the license pool unit according to the license setting.

According to another embodiment of the present invention, a method for dynamic software license is disclosed. The method for dynamic software license is used in a dynamic software license platform comprising a license pool. The method for dynamic software license comprises: adding the software license provided by the software supplier to the license pool; receiving a software application from a user end; granting a setting permission to the user end in response to the software application, and allowing the user end to submit a license setting according to the setting permission; and dynamically providing the software license from the license pool unit according to the license setting.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
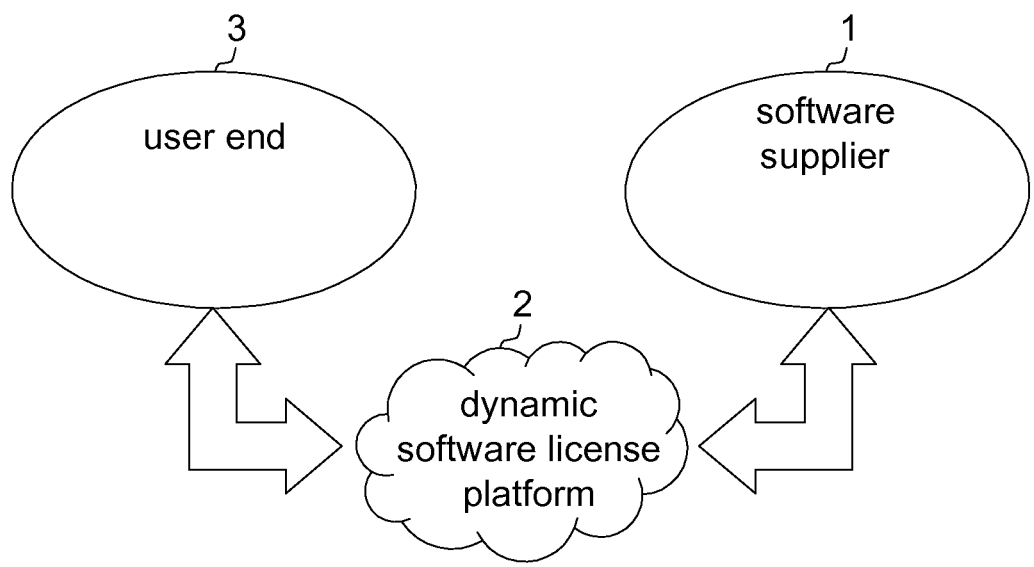
FIG. 1 shows a schematic diagram of a user end obtaining a software license via a dynamic software license platform.

Referring to FIG. 1, a schematic diagram of a user end obtaining a software license via a dynamic software license platform is shown. The software supplier 1 provides software and a software license to the dynamic software license platform 2. The dynamic software license platform 2 dynamically provides the software license required by the user end 3 according to actual needs in the user end 3.

Figure 2:
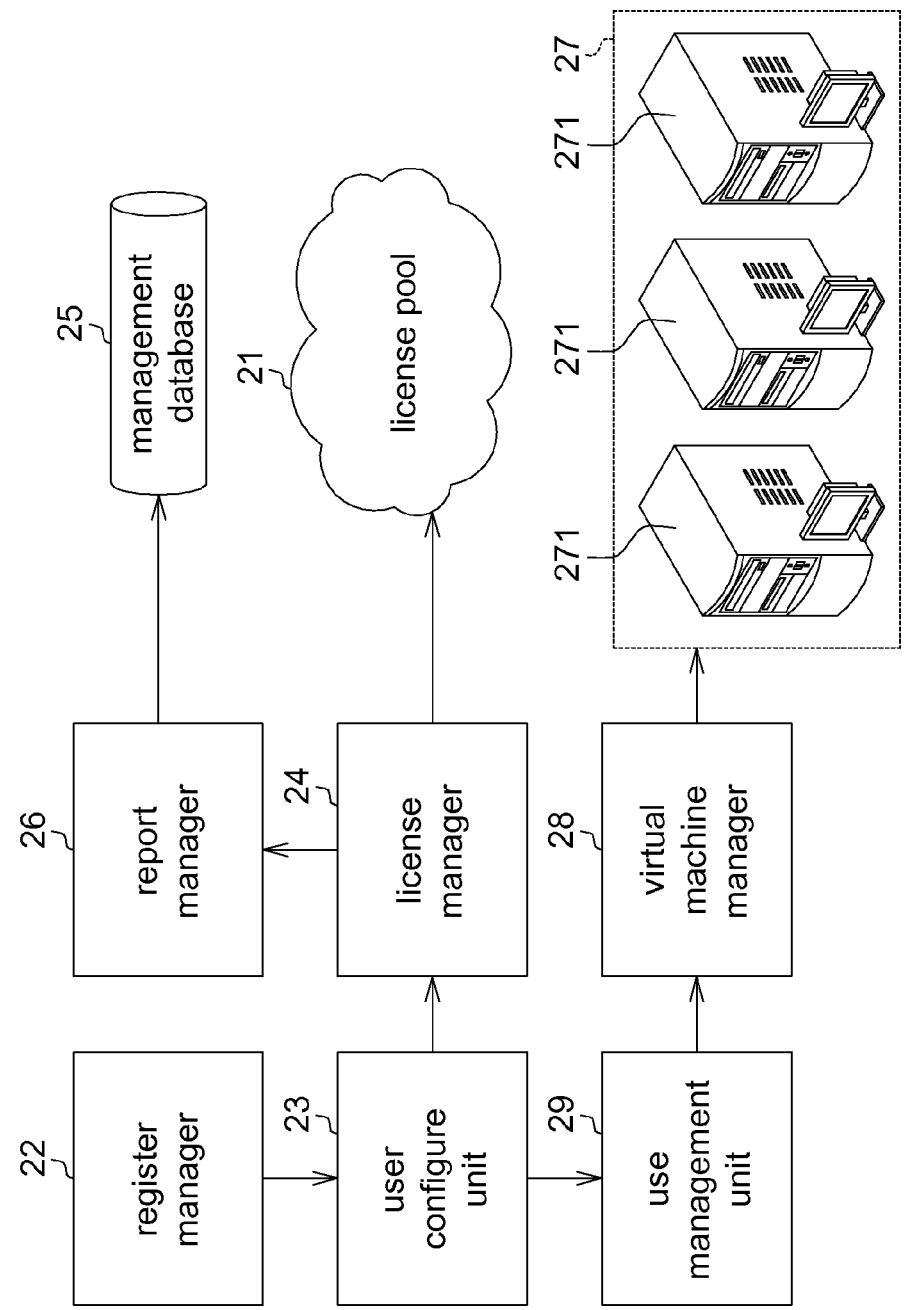
FIG. 2 shows a schematic diagram of a dynamic software license platform.
Figure 3:
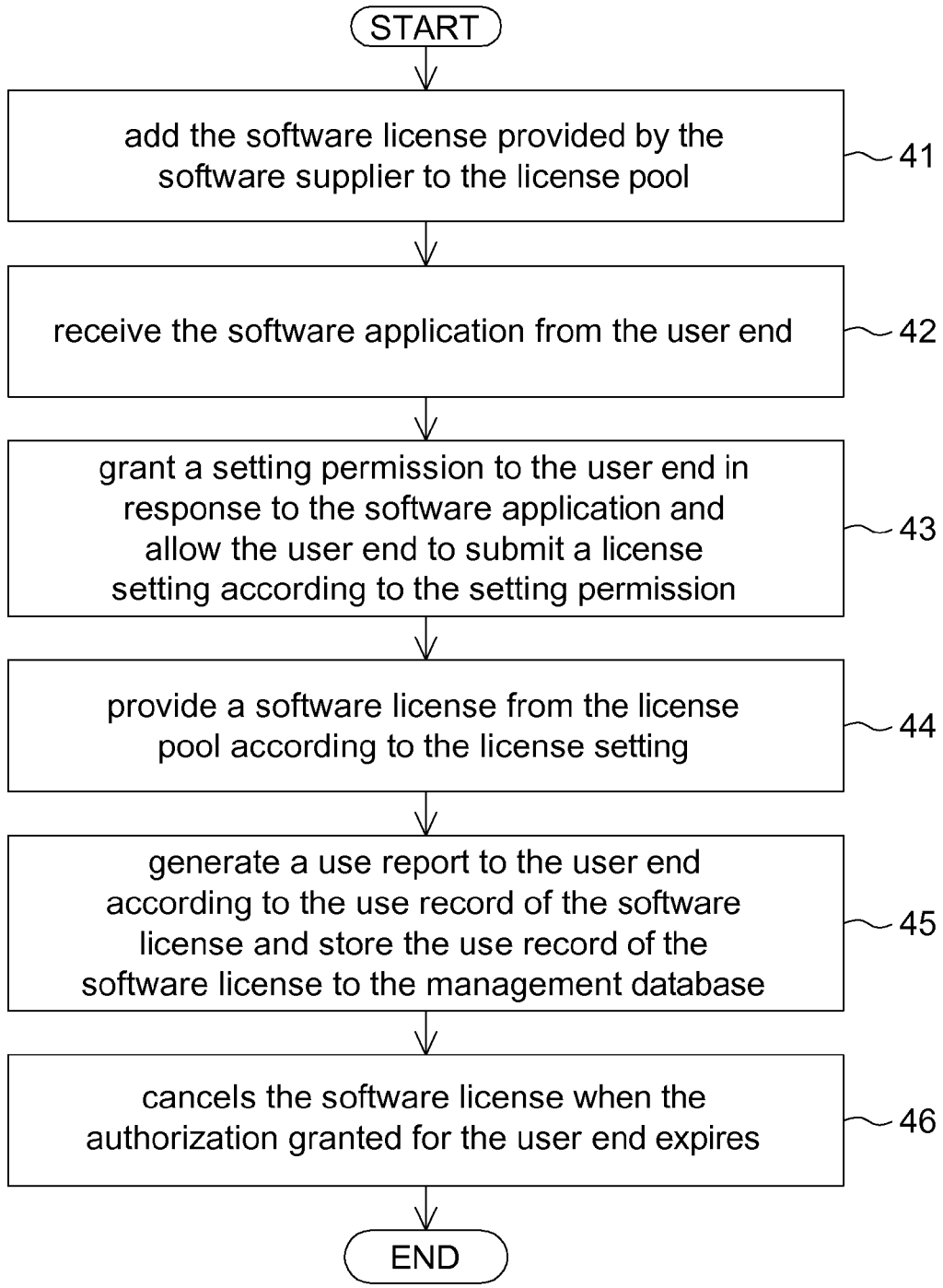
FIG. 3 shows a flowchart of a method for dynamic software license.

Referring to FIG. 1, FIG. 2 and FIG. 3. FIG. 2 shows a schematic diagram of a dynamic software license platform. FIG. 3 shows a flowchart of a method for dynamic software license. The dynamic software license platform 2 comprises a license pool 21, a register manager 22, a user configure unit 23, a license manager 24, a management database 25, a report manager 26, a virtual machine pool 27, a virtual machine manager 28 and a use management unit 29. The virtual machine pool 27 comprises a virtual machine (VM) 271. The virtual machine manager 28 manages the virtual machine 271 to provide a virtual machine service. The virtual machine 271 may be realized by associated application programs executed by the server located in the dynamic software license platform 2. The use management unit 29 determines whether to provide the virtual machine service to the user end 3 according to the license setting.

The method for dynamic software license is used in a dynamic software license platform 2, and comprises the following steps: Firstly, as indicated in step 41, the license manager 24 adds the software license provided by the software supplier 1 to the license pool 21. Besides, the virtual machine manager 28 may further install the corresponding software of the software license to the virtual machine 271 and update the software installation information of the virtual machine 271, and the register manager 26 may further add the corresponding software of the software license to the software market. When the software version of the software supplier is updated, the software version of the dynamic software license platform 2 simultaneously provides the updated software version. Thus, the user in the user end does not need to purchase the software of other versions simply because the software version is updated.

Next, as indicated in step 42, the software application is received from the user end 3. The user end 3 may obtain an account from the dynamic software license platform 2, so that the user end 3, after logging on the dynamic software license platform 2, may lodge an application to purchase software from the software market. Examples of optional items of the software application comprise the name, the version, the pricing, the specified effective date and the virtual machine service of the software. The so called "virtual machine service" allows the user end 3 to use software on line after getting on the Internet without having to install the software to the computer host.

Then, as indicated in step 43, the user configure unit 23, in response to the software application, grants a setting permission to the user end 3, and allows the user end 3 to submit a license setting according to the setting permission. The license setting comprises such as a list of equipment using the software, and the distribution, the priority order and the specified effective date of the software license. The equipment used for executing the software is not limited to the computer host in the user end 3, and may also be the virtual machine 271 located in the dynamic software license platform 2.

Then, as indicated in step 44, the license manager 24 dynamically provides a software license from the license pool 21 according to the license setting. The license manager 24 provides the software license from the license pool 21 to the computer host located in the user end 3 or the virtual machine 271 located in the dynamic software license platform 2 according to the license setting. If the user end applies for the virtual machine service, the user in the user end may immediately get on line to use the software without having to install software to the computer host located in the user end, largely increasing the convenience of use.

Then, as indicated in step 45, the report manager 26 generates a use report to the user end 3 according to the use record of the software license and stores the use record of the software license to the management database 25. The use report comprises such as a consumer bill or a statistical report. The charges of the consumer bill are such as based on annual, seasonal, monthly, weekly, daily or actual usage. Thus, when the demand for the software is still uncertain, the user end 3 may satisfy the temporary needs through the dynamic software license platform 2 without having to purchase the software license and make the payment immediately.

The user end 3 understands the status of the use of the software through the statistical report generated by the report manager 26 and further uses the statistical report as a basis for determining whether to upgrade the software. Additionally, with respect to the indispensable but seldom used software, the user end 3 may reduce the purchase cost through the dynamic software license platform 2. Then, as indicated in step 46, the dynamic software license platform 2 cancels the software license when the authorization granted for the user end 3 expires.

Furthermore, after the dynamic software license platform 2 obtains a certain number of software licenses from the software supplier 1, the license manager 24 adds corresponding software name and number M of licenses to the license pool 21. If the number of software licenses required by the user end 3 is N, then the license manager 24 checks whether N is smaller than M to assure that the license pool 21 is able to provide sufficient software licenses to the user end 3, wherein, both M and N are positive integrals greater than 0. If the license manager 24 confirms that N is smaller than M, the license manager 24 provides N software licenses to the user end 3 and changes the number of software licenses of the license pool 21 from M to (M−N).

Although the user end 3 only purchased P software licenses, there may be more than P users in the user end 3 requesting a software license from the dynamic software license platform 2. To resolve such problem, the license manager 24 may further assign respective priority level for each user in the user end 3 according to the license setting submitted from the user end 3. For example, the 5 users A-E in the user end 3 purchase only 3 software licenses. The license manager 24 may set the user A as the highest priority level and set the users BE as ordinary priority level. Thus, the user A is always able to use the software license, and the users BE can only share the two remaining software licenses. The license manager 24 may provide the two remaining software licenses according to the request order of the users B~E. In other words, the two users who submitted the request earlier than the other two users are entitled to use the two remaining software licenses.

When the user end 3 obtains the software, the register manager 22 correspondingly sets a software expiring date, and will ask whether the user end 3 would like to extend the expiring date before the software expires.

Figure 4:
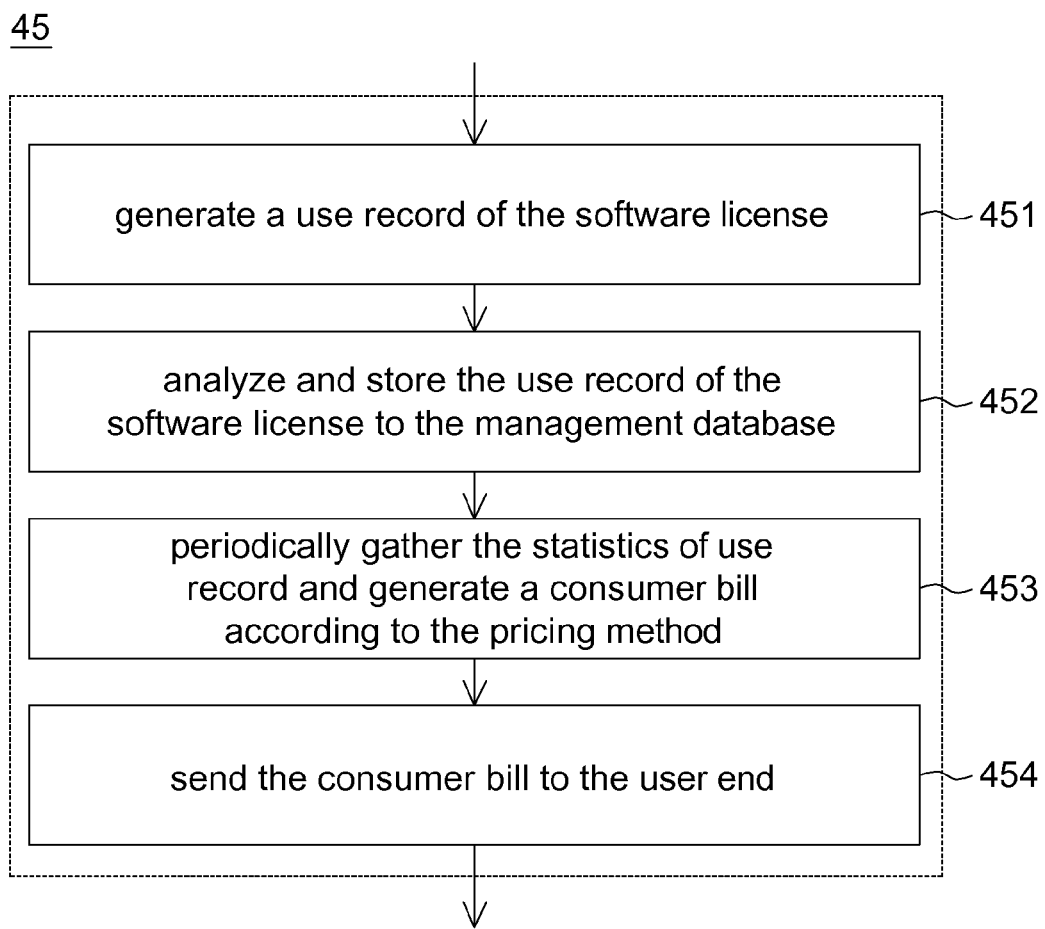
FIG. 4 shows a detailed flowchart of step 45.

Referring to FIG. 1, FIG. 2, FIG. 3 and FIG. 4. FIG. 4 shows a detailed flowchart of step 45. Step 45 further comprises sub-steps 451~454. Firstly, as indicated in step 451, the report manager 26 generates a use record of the software license. Next, as indicated in step 452, the report manager 26 analyzes and stores the use record of the software license to the management database 25. Then, as indicated in step 453, the report manager 26 periodically gathers the statistics of use record and generates a consumer bill according to the pricing method. Then, as indicated in step 454, the register manager 22 sends the consumer bill to the user end 3.

Figure 5:
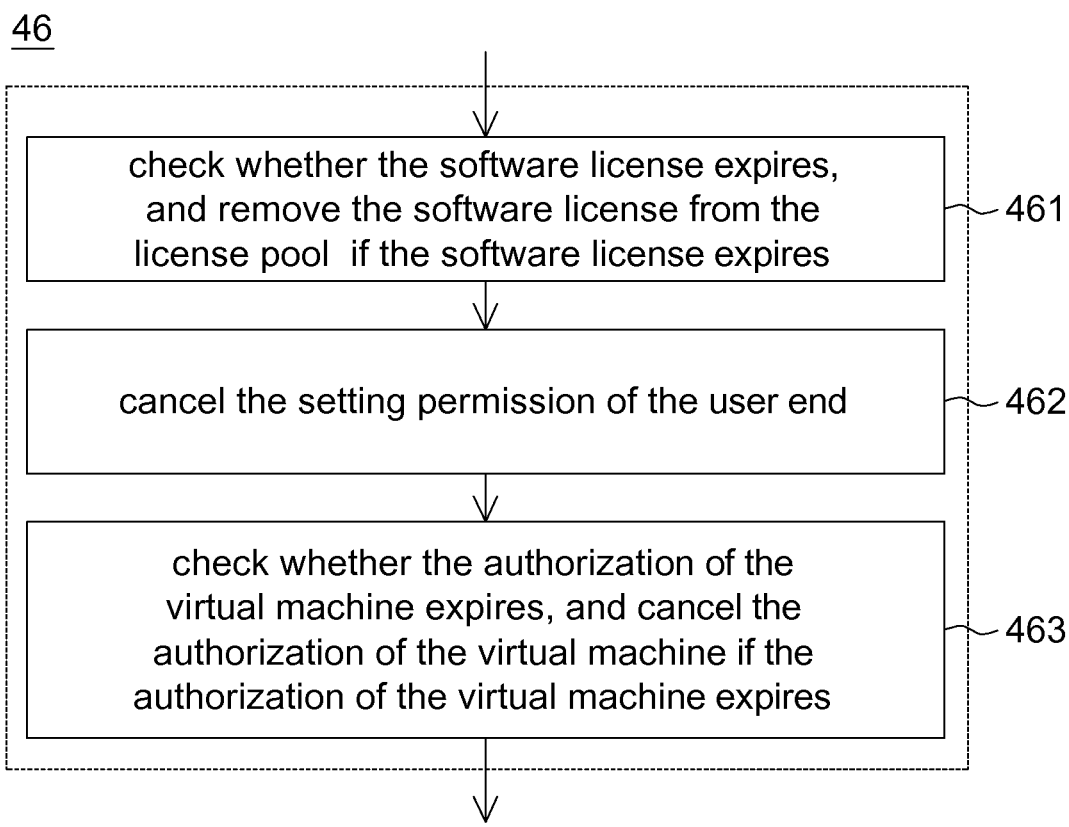
FIG. 5 shows a detailed flowchart of step 46.

Referring to FIG. 1, FIG. 2, FIG. 3 and FIG. 5. FIG. 5 shows a detailed flowchart of step 46. Step 46 further comprises sub-steps 461~463. Firstly, as indicated in step 461, the register manager 22 checks whether the software license expires, and removes the software license from the license pool 21 if the software license expires. Next, as indicated in step 462, the register manager 22 cancels the setting permission of the user end 3. Then, as indicated in step 463, the virtual machine manager 24 checks whether the authorization of the virtual machine expires, and cancels the authorization of the virtual machine if the authorization of the virtual machine expires.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A dynamic software license platform, comprising:
a license pool;
a register manager used for receiving a request from a user end to use a piece of software;
a user configure unit used for granting a permission to the user end in response to the request, to thereby allow the user end to submit a license setting that indicates a scope of the use desired by the user end; and
a license manager used for adding a software license provided by a supplier of the piece of software to the license pool, and dynamically providing the software license from the license pool to the user end according to the license setting submitted by the user end;
wherein the license setting from the user end indicates whether the software license is provided to either of a computer host of the user end and a virtual machine in the dynamic software license platform; and
wherein, when a number of software licenses required by the user end is greater than a number of the software licenses of the license pool, a highest priority user gets the software license and ordinary priority users share remaining software licenses according to a request order of the ordinary priority users.

2. The dynamic software license platform according to claim 1, further comprising:
a virtual machine pool unit comprising a plurality of virtual machines (VM);
a virtual machine manager used for managing the virtual machines to provide a virtual machine service; and
a use management unit used for determining whether to provide the virtual machine service to the user end according to the license setting submitted by the user end.

3. The dynamic software license platform according to claim 2, wherein the virtual machine manager installs the corresponding software of the software license to the virtual machines and updates the software installation information of the virtual machines.

4. The dynamic software license platform according to claim 2, wherein the virtual machine service refers to the actions that the virtual machine manager sets a virtual machine authorization to the user end, and that the virtual machine manager checks whether the authorization of the virtual machine expires and cancels the authorization of the virtual machine when the authorization of the virtual machine expires.

5. The dynamic software license platform according to claim 1, wherein the register manager sets a software expiring date, and inquires of the user end whether to extend the software expiring date before the software expiring date expires.

6. The dynamic software license platform according to claim 1, further comprising:
- a management database; and
- a report manager used for generating a use report according to the use record of the software license, and storing the use record of the software license to the management database.

7. The dynamic software license platform according to claim 1, wherein the register manager checks whether the software license expires, and removes the software license from the license pool if the software license expires.

8. The dynamic software license platform according to claim 7, wherein the register manager cancels the permission of the user end when the software license expires.

9. The dynamic software license platform according to claim 1, wherein the license setting comprises a list of equipment using the software, and the distribution and the specified effective date of the software license.

10. The dynamic software license platform according to claim 1, wherein the license manager checks whether the number of software licenses required by the user end is smaller than the number of software licenses of the license pool, and when the number of software licenses required by the user end is smaller than the number of software licenses of the license pool, the number of software licenses required by the user end is subtracted from the number of software licenses of the license pool.

11. The dynamic software license platform according to claim 1, wherein the license manager sets priority level for each user at the user end according to the license setting, in order to determine each user's priority in getting the software license.

* * * * *